(12) United States Patent
Broyles et al.

(10) Patent No.: US 7,694,120 B2
(45) Date of Patent: Apr. 6, 2010

(54) PIN STRAP SETTING OVERRIDE SYSTEM AND METHOD

(75) Inventors: Paul J. Broyles, Cypress, TX (US); Gregory P. Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 11/654,977

(22) Filed: Jan. 18, 2007

(65) Prior Publication Data

US 2008/0177932 A1    Jul. 24, 2008

(51) Int. Cl.
*G06F 15/177* (2006.01)
(52) U.S. Cl. .............................. 713/1; 713/2; 713/100; 711/103
(58) Field of Classification Search ...................... 713/1, 713/2, 100; 711/103
See application file for complete search history.

(56) References Cited

U.S. PATENT DOCUMENTS

| 5,175,840 | A | * | 12/1992 | Sawase et al. ............... 711/103 |
| 5,264,742 | A | * | 11/1993 | Sourgen ...................... 326/37 |
| 5,293,610 | A | * | 3/1994 | Schwarz ..................... 711/164 |
| 5,345,413 | A | * | 9/1994 | Fisher et al. .................. 365/96 |
| 5,357,572 | A | * | 10/1994 | Bianco et al. ............... 713/193 |
| 5,941,987 | A | * | 8/1999 | Davis .......................... 726/26 |

* cited by examiner

*Primary Examiner*—Nitin C Patel

(57) ABSTRACT

A pin strap setting override system comprises logic configured to determine whether a pin strap setting for at least one feature of an integrated circuit (IC) is set to enable, the logic further configured to automatically override the enable pin strap setting if a flag stored in a memory indicates a disable setting for the at least one feature.

19 Claims, 3 Drawing Sheets

PIN STRAP SETTING OVERRIDE SYSTEM AND METHOD

BACKGROUND OF THE INVENTION

Integrated circuits (ICs), such as central processing units (CPUs) and other firmware ICs, have settings that are controlled using external switch settings such as pin straps. These settings may include oscillator speeds, initial configuration control and/or signal the enabling or disabling of various features. The pin straps are typically set to one of two values during the manufacturing of a computer system having such an IC by either introducing or bypassing a resistance, by using jumper connections and/or using other switch devices. During computer system power-up, a chipset or firmware reads the switch setting(s) and sets a configuration in the IC accordingly so that the IC operates with the selected feature(s). However, country-specific and/or other types of restrictions may prohibit using computer systems having a particular function disposed thereon, such as a security function. Although computer systems may be specially manufactured to accommodate and/or comply with such restrictions, building and tracking these specially-manufactured computer systems during the manufacturing process, and thereafter, is costly. Moreover, although a particular feature may be disabled using a pin strap setting, pin strap settings are not entirely tamper-resistant.

BRIEF DESCRIPTION OF THE DRAWINGS

For a more complete understanding of the present invention, the objects and advantages thereof, reference is now made to the following descriptions taken in conjunction with the accompanying drawings, in which.

DETAILED DESCRIPTION OF THE DRAWINGS

Figure 1:
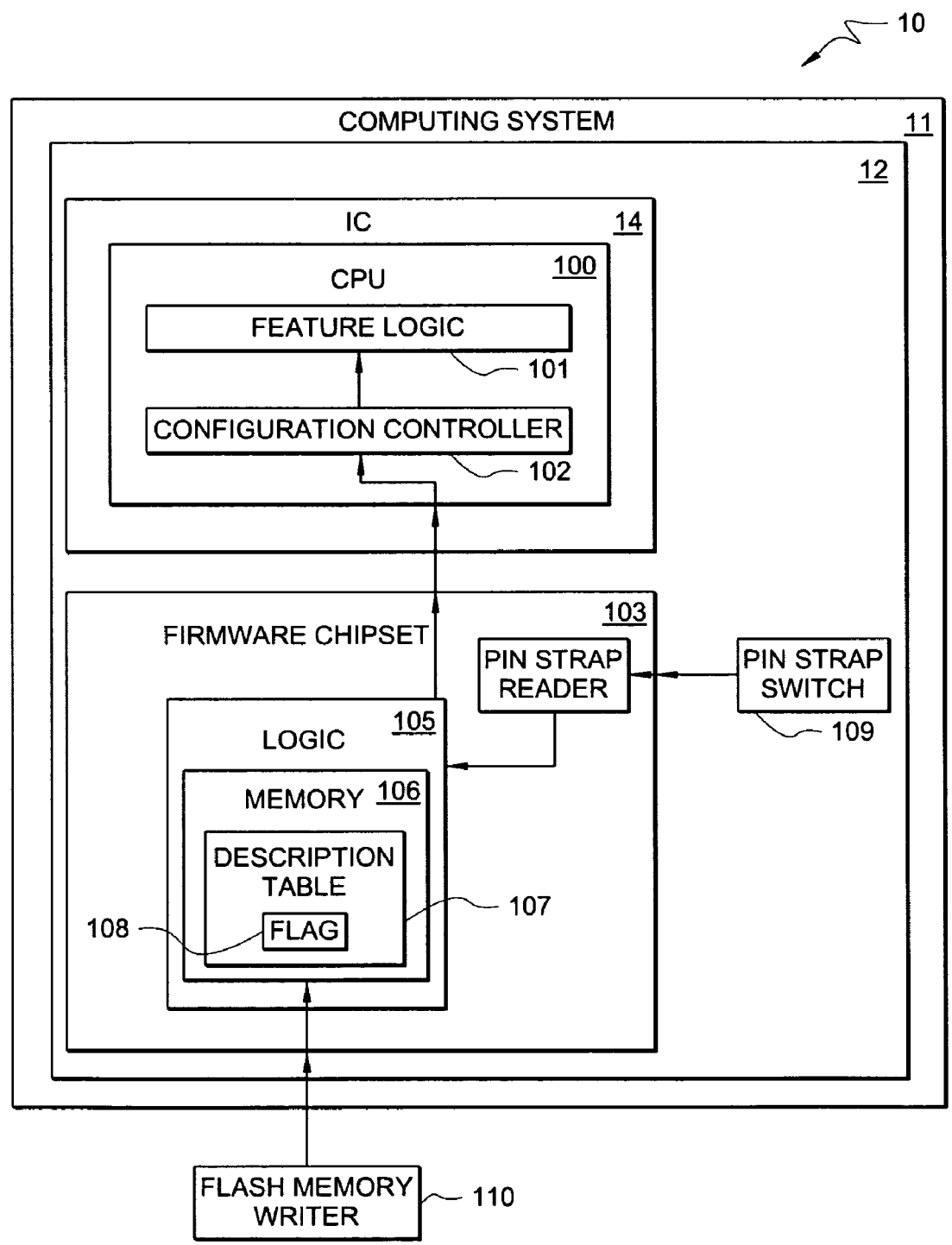
FIG. 1 is a block diagram illustrating an embodiment of a pin strap setting override system.

FIG. 1 is a diagram illustrating an embodiment of a pin strap setting override system 10. In the embodiment illustrated in FIG. 1, system 10 is implemented in a computing system 11 having a circuit board 12 with at least one integrated circuit (IC) and a pin strap switch 109 disposed thereon. In some embodiments, pin strap switch 109 is a switch or jumper pins that are set by a human or machine when computing system 11 is constructed or modified. Pin strap switch 109 is connected to a pin input of an IC and is used to select a particular voltage or resistance to be applied to the IC pin. The IC can then sense the voltage or resistance and use the sensed value as input for an initial configuration, such as turning on or off an optional feature or selecting a clock speed.

In the embodiment illustrated in FIG. 1, the ICs on circuit board 12 comprise a central processing unit (CPU) 100 and a firmware chipset 103. Computing system 11 may comprise any type of computing device such as, but not limited to, a desktop computer, a notebook or laptop computer, a server, a workstation, a personal digital assistant, a gaming device, or any other type of portable or non-portable device. In FIG. 1, firmware chipset 103 is coupled to pin strap switch 109 and to CPU 100. In the embodiment illustrated in FIG. 1, CPU 100 comprises feature logic 101 associated with a particular feature of CPU 100 such as, but not limited to, a cryptographic security feature. In FIG. 1, CPU 100 also comprises a configuration controller 102 that is used to enable or disable feature logic 101. Feature logic 101 and configuration controller 102 may comprise hardware, firmware, software, or a combination thereof, and may be embodied, at least partly, in the form of a set of executable instructions. In some embodiments, configuration controller 102 comprises a set of registers within CPU 100 for holding and/or otherwise storing configuration and startup information for CPU 100 usable when CPU 100 begins processing instructions. In some embodiments, feature logic 101 comprises a portion of CPU 100 having processing functionality, such as a cryptographic routine, which is selectively available based on the status of a register in configuration controller 102.

Firmware chipset 103 is used to set the state of configuration controller 102 as part of a reset process, but before CPU 100 begins processing instructions. The reset process occurs when CPU 100 is first powered-on or is otherwise forced into a reset process by a user or system software. During the reset process, firmware chipset 103 uses a pin strap reader circuit 104 to determine the voltage or resistance selected or set by pin strap switch 109. The voltage or resistance indicates a desired setting for a selectable feature or value in CPU 100 (e.g., generally set by the assembler of computing system 11 based on information published by the manufacturer of CPU 100 or firmware chipset 103 that equates a particular voltage or resistance with each possible setting). At the time that firmware chipset 103 is configuring CPU 100, CPU 100 is not processing instructions. Firmware chipset 103 contains logic and circuits to translate the sensed voltage or resistance into a signal that is sent to configuration controller 102 in CPU 100. Configuration controller 102 then enables or disables feature logic 101 based on the state set by firmware chipset 103 so that the setting of pin strap switch 109 has now affected the configuration of CPU 100. After this, CPU 100 begins processing instructions, but with its configuration already set. In some embodiments, firmware chipset 103 comprises a basic input/output system (BIOS).

Thus, for example, after power is supplied to firmware chipset 103 and CPU 100, firmware chipset 103 sets the state of a register in configuration controller 102 to either enable or disable feature logic 101. Then, CPU 100 begins processing instructions with the set configuration. During the time that CPU 100 is operating, certain instructions may attempt to trigger the operation and/or execution of feature logic 101 or ascertain whether feature logic 101 is available for use. Feature logic 101 will only be available if, during the reset process, configuration controller 102 enabled feature logic 101.

In the embodiment illustrated in FIG. 1, firmware chipset 103 comprises a pin strap reader 104, a logic module 105 and a memory 106. Pin strap reader 104 is configured to read the setting of pin strap switch 109. In some embodiments, pin strap switch 109 is set to a particular setting during assembly/manufacture of computing system 11; however, it should be understood that the particular setting of pin strap switch 109 may be set or changed at another time. In some embodiments, pin strap reader 104 reads the setting of pin strap switch 109 by sensing a resistance or voltage at a pin connector which couples firmware chipset 103 to pin strap switch 109 such that the read resistance or voltage value is indicative of the pin strap switch 109 setting. In some embodiments, a manufacturer of computing system 11 may desire to disable feature logic 101 and, therefore, sets pin strap switch 109 to a disable setting. Firmware chipset 103 uses logic module 105 to override an enable setting of pin strap switch 109 (e.g., if the setting of pin strap switch 109 has been changed to an enable setting, whether intentionally or unintentionally and whether authorized or unauthorized), thereby ensuring that feature logic 101 is disabled.

In operation, during the reset process, before firmware chipset 103 sets the state of configuration controller 102, logic 105 reads a flag 108 from memory 106. In some embodiments, flag 108 has two settings: disable, or enable control by pin strap switch 109. With only two settings, flag 108 requires only a single bit. In some embodiments, memory 106 comprises flash memory and holds a descriptor table 107 having initial configuration information used by firmware chipset 103 to initialize CPU 100. In the embodiment illustrated in FIG. 1, flag 108 is within descriptor table 107 portion of memory 106. Logic 105 is coupled to an output of pin strap reader 104 and is thus able to determine the state of pin strap switch 109 by sensing the signal output by pin strap reader 104. Thus, in operation, if flag 108 is set to enable control by pin strap switch 109, logic 105 does not alter the result of pin strap reader 104 (e.g., the setting of pin strap switch 109, whether enable or disable, is passed by firmware chipset 103 to configuration controller 102). If flag 108 is set to disable feature logic 101, logic 105 ensures that firmware chipset 103 instructs configuration controller 102 to disable feature logic 101. In some embodiments, one way logic 105 is used to ensure that configuration controller 102 is set to disable feature logic 101 by examining the output of pin strap reader 104 and inverting the setting if pin strap switch 109 is set to enable. Alternatively, in some embodiments, logic 105 is configured to pass a disable signal to configuration controller 102 independent of the setting of pin strap switch 109. Thus, if a disable setting for feature logic 101 is desired, flag 108 is set to ensure that feature logic 101 is disabled regardless of the hardware setting (i.e., the setting of pin strap switch 109), thereby overriding the setting of pin strap switch 109 if the setting of pin strap switch 109 is set to enable. If flag 108 is not set to disable, the hardware setting (i.e., the setting of pin strap switch 109) is used to determine whether feature logic 101 is enabled or disabled.

In the embodiment illustrated in FIG. 1, a flash memory writer 110 is coupled to memory 106 (e.g., during the manufacture of computing system 11 or otherwise) for writing content to memory 106 such as information in descriptor table 107 and the setting for flag 108. Preferably, after writing the contents of memory 106, flash memory writer 110 locks memory 106 so that the contents may not be changed. Additionally, in some embodiments, portions of memory 106 are read-protected so that even CPU 100 is unable to read descriptor table 107, including the setting of flag 108. With at least descriptor table 107 locked for read/write protection, the state of flag 108 may only be determined by firmware chipset 103. Thus, by the time CPU 100 is brought out of reset to begin processing instructions, flag 108 is unavailable even to CPU 100 for reading or writing, and the configuration of CPU 100, regarding the availability of feature logic 101, is already set.

Although FIG. 1 is shown controlling a single feature on a CPU (e.g., feature logic 101), it should be understood that a greater number of features may be controlled on any type of integrated circuit. Further, it should be understood that alternative signaling options may be used in addition to or besides a pin strap, such as jumpers, toggle switches or combinations of switches.

Figure 2:
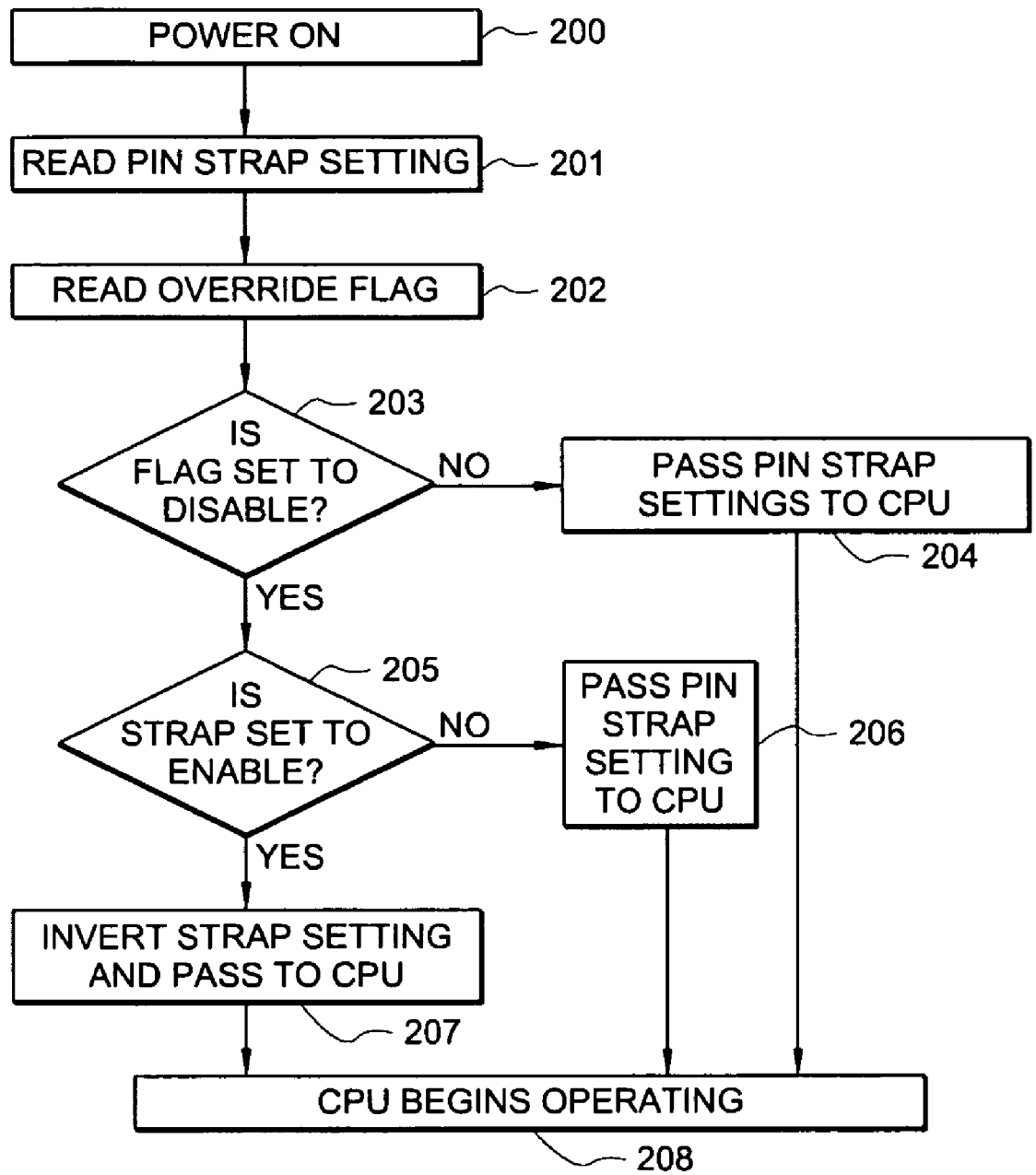
FIG. 2 is a flow diagram illustrating an embodiment of a pin strap setting override method.

FIG. 2 is a flow diagram illustrating an embodiment of a pin strap override method. The method begins at block 200, where computing system 11 is powered on, thereby initiating a reset process which extends through block 207. At block 201, the setting of pin strap switch 109 is read by pin strap reader 104 and is passed to logic 105. At block 202, logic 105 reads the state of flag 108. The setting of flag 108 is used in decision block 203. If flag 108 is not set to disable, the method proceeds to block 204, where the setting of pin strap switch 109, whether enable or disable, is passed to CPU 100. The method then proceeds to block 208, where CPU 100 is out of the reset process and begins operating to process instructions. If at decision block 203 it is determined that flag 108 is set to disable, the method proceeds to decision block 205, where the setting of pin strap switch 109 is used to determine whether the setting is to be inverted.

If at decision block 205 it is determined that the setting for pin strap switch 109 is disable, the method proceeds to block 206, where the disable setting of pin strap switch 109 is passed to CPU 100. The method then proceeds to block 208. If at decision block 205 it is determined that the setting for pin strap switch 109 is enable, the method proceeds to block 207, where the setting of pin strap switch 109 is inverted and a disable setting is then passed to CPU 100. Thus, in either case of the setting of pin strap switch 109, if flag 108 is set to disable, feature logic 101 is disabled. If pin strap switch 109 is tampered with by a user after a manufacturer or other user of computing system 11 sets pin strap switch 109 to disable, logic 105 and flag 108 will ensure that feature logic 101 is not enabled.

Figure 3:
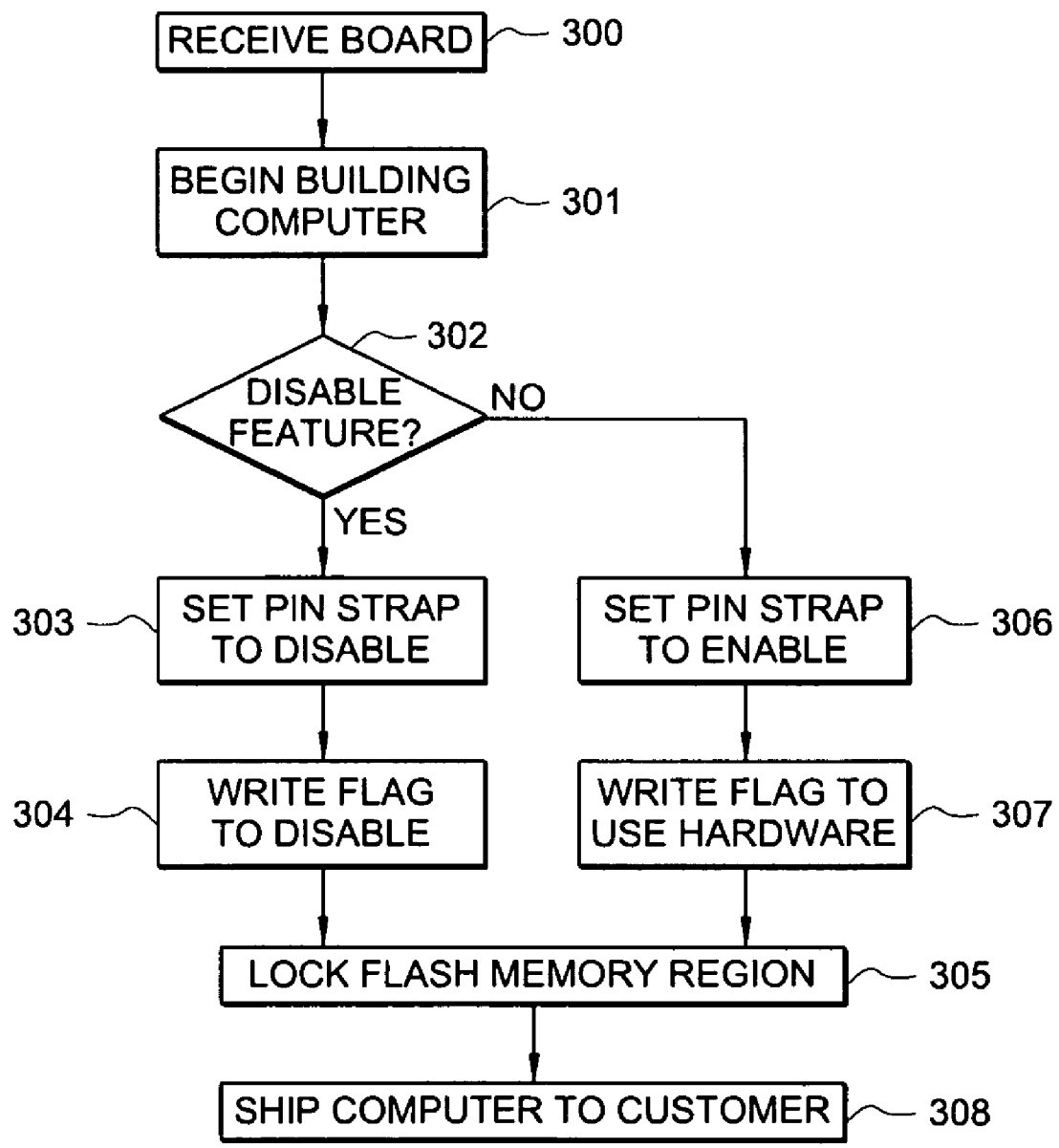
FIG. 3 is a flow diagram illustrating another embodiment of a pin strap setting override method.

FIG. 3 is a flow diagram illustrating another embodiment of a pin strap override method. The method begins at block 400, where circuit board 12 is received, for example, by a manufacturer of computing system 11. At decision block 402, a determination is made whether computing system 11 is to be configured having feature logic 101 enabled or disabled. If feature logic 101 is to be disabled, the method proceeds to block 403, where the manufacturer sets pin strap switch 109 to the disable setting and, at block 404, sets/writes flag 108 to disable. It should also be understood that if feature logic 101 is to be disabled, setting pin strap switch 109 to disable is optional because feature logic 101 will be disabled even if pin strap switch 109 is set to enable. At block 405, descriptor table 107, or possibly all of memory 106, is locked to prevent reading or writing of the flag by CPU 100.

If at decision block 402 it is determined that feature logic 101 is not to be disabled, pin strap switch 109 is set to enable (unless pin strap switch 109 set to enable by default). At block 407, flag 108 is set to indicate use of the pin strap switch 109 setting. Feature logic 101 can only be enabled if flag 108 is set to use the pin strap switch 109 setting and pin strap switch 109 set to enable. The method proceeds to block 405.

Thus, embodiments of system 10 enable a pin strap setting to be overridden to ensure that a desired disable setting for a particular IC feature is maintained. For example, if a user of computing system 11 attempts to alter the setting of pin strap switch 109 in an attempt to enable use of feature logic 101, system 10 overrides the tampered setting to ensure that feature logic 101 remains disabled. It should be understood that in the described methods, certain functions may be omitted, accomplished in a sequence different from that depicted in FIGS. 2 and 3, or simultaneously performed. Also, it should be understood that the methods depicted in FIGS. 2 and 3 may be altered to encompass any of the other features or aspects as described elsewhere in the specification. Further, embodiments may be implemented in software and can be adapted to run on different platforms and operating systems. In particular, functions implemented by logic 105, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

What is claimed is:

1. A pin strap setting override method, comprising:
   determining whether a pin strap setting of a pin strap switch for at least one feature of an integrated circuit (IC) is set to enable, wherein the determining is performed by a pin strap reader in a chipset separate from the IC;
   automatically overriding, by the chipset, the enable pin strap setting if a flag stored in a memory indicates a disable setting for the at least one feature; and
   if the flag stored in the memory does not indicate the disable setting, configuring, by the chipset, the IC to enable the at least one feature in response to the chipset detecting the pin strap setting set to enable.

2. The method of claim 1, wherein automatically overriding comprises inverting a value of the pin strap setting.

3. The method of claim 1, wherein the memory is a flash memory, and wherein the method further comprises reading the flag from the flash memory.

4. The method of claim 3, wherein reading from the flash memory comprises reading from a firmware descriptor table in the flash memory.

5. The method of claim 1 further comprising configuring the flag in the memory to be unreadable by the IC by read-protecting a portion of the memory containing the flag.

6. The method of claim 5, wherein the IC is a central processing unit (CPU), and wherein read-protecting the portion of the memory renders the flag unreadable by the CPU.

7. The method of claim 1 further comprising configuring the flag in the memory to be unwritable by the IC by write-protecting a portion of the memory containing the flag.

8. The method of claim 1 further comprising automatically overriding the enable pin strap setting to disable a security feature of the IC.

9. The method of claim 1, wherein the IC is a central processing unit (CPU), wherein the flag is read-protected such that the CPU is unable to read the flag, and wherein automatically overriding the enable pin strap setting is performed by the chipset based on the pin strap reader in the chipset detecting that the flag indicates the disable setting.

10. A pin strap setting override system, comprising:
    a memory; and
    a chipset having logic configured to determine whether a pin strap setting of a pin strap switch for at least one feature of an integrated circuit (IC) is set to enable, wherein the chipset is separate from the IC, the logic further configured to:
    automatically override the enable pin strap setting if a flag stored in the memory indicates a disable setting for the at least one feature; and
    if the flag stored in the memory does not indicate the disable setting, configure the IC to enable the at least one feature in response to the chipset detecting the pin trap setting set to enable.

11. The system of claim 10, wherein the memory is a flash memory.

12. The system of claim 10, wherein the flag in the memory is configured to be unreadable by the IC, and wherein the logic is configured to override the enable pin strap setting based on the logic reading the flag indicating the disable setting instead of the IC reading the flag indicating the disable setting.

13. The system of claim 10, wherein the at least one feature of the IC comprises a security feature of the IC.

14. The system of claim 10, wherein the enable pin strap setting is overridden during a reset process associated with the IC.

15. The system of claim 10, wherein the chipset is a firmware chipset.

16. The system of claim 10, wherein the logic is configured to set a state of a configuration controller associated with the IC to enable or disable the at least one feature.

17. The system of claim 10, wherein the IC is a central processing unit (CPU), wherein the flag is read-protected such that the CPU is unable to read the flag, and wherein the enable pin strap setting is overridden based on the logic in the chipset detecting that the flag indicates the disable setting.

18. A computer system comprising:
    a pin strap switch configurable to enable or disable at least one feature;
    a central processing unit (CPU);
    a memory to store a flag; and
    a chipset separate from the CPU and including logic configured to:
    read a setting of the pin strap switch, wherein the setting includes one of an enable setting and a disable setting;
    in response to reading the enable setting and detecting that the flag indicates that the at least one feature is to be enabled, configure the CPU to enable the at least one feature; and
    in response to detecting that the flag indicates that the at least one feature is to be disabled, configure the CPU to disable the at least one feature even if the setting of the pin strap switch has the enable setting.

19. The computer system of claim 18, wherein the flag is read-protected to render the flag unreadable by the CPU, wherein the logic in the chipset instead of the CPU is configured to read a state of the flag to determine whether or not to override the enable setting of the pin strap switch.

* * * * *

UNITED STATES PATENT AND TRADEMARK OFFICE
CERTIFICATE OF CORRECTION

| | |
|---|---|
| PATENT NO. | : 7,694,120 B2 |
| APPLICATION NO. | : 11/654977 |
| DATED | : April 6, 2010 |
| INVENTOR(S) | : Paul J. Broyles et al. |

It is certified that error appears in the above-identified patent and that said Letters Patent is hereby corrected as shown below:

In column 6, line 9, in Claim 10, delete "trap" and insert -- strap --, therefor.

Signed and Sealed this

Fifteenth Day of June, 2010

David J. Kappos
*Director of the United States Patent and Trademark Office*